United States Patent [19]
Kirton et al.

[11] 3,835,553
[45] Sept. 17, 1974

[54] APPARATUS FOR TEACHING

[75] Inventors: Joseph Mason Kirton; J. Wanless Southwick, both of Bountiful, Utah

[73] Assignee: Research Enterprises, Inc., Woods Cross, Utah

[22] Filed: Jan. 12, 1973

[21] Appl. No.: 322,928

[52] U.S. Cl. ................................................. 35/9 C
[51] Int. Cl. ............................................. G09b 7/00
[58] Field of Search ............. 35/8 R, 9 R, 9 B, 9 C, 35/9 D, 35 C, 48 R, 25, 1

[56] References Cited
UNITED STATES PATENTS

| | | | |
|---|---|---|---|
| 2,546,666 | 3/1951 | Fleischer | 35/9 C |
| 3,100,352 | 8/1963 | Boissevain | 35/9 C |
| 3,177,595 | 4/1965 | Yonker et al. | 35/9 C X |
| 3,416,241 | 12/1968 | Weitzner | 35/35 C |
| 3,416,243 | 12/1968 | Greenberg et al. | 35/48 R |
| 3,478,441 | 11/1969 | Zadig | 35/9 C |
| 3,522,665 | 8/1970 | Kalt | 35/9 C |

*Primary Examiner*—Robert W. Michell
*Assistant Examiner*—Vance Y. Hum
*Attorney, Agent, or Firm*—Hill, Gross, Simpson, Van Santen, Steadman, Chiara & Simpson

[57] ABSTRACT

A teaching device having a pair of electrodes at its tip normally insulated from each other but which when placed against conductive material completes a circuit to actuate an indicator. The indicator might be in the form of a light or a counter, mounted either in the device, or remotely coupled to the device by a suitable radio transmitting means, or wiring. In certain embodiments, second means are provided for indicating when the device has been actuated by the student such that the number of actuations may be compared with the number of times that a conductive area was encountered so as to allow grading of test results to be accomplished.

2 Claims, 6 Drawing Figures

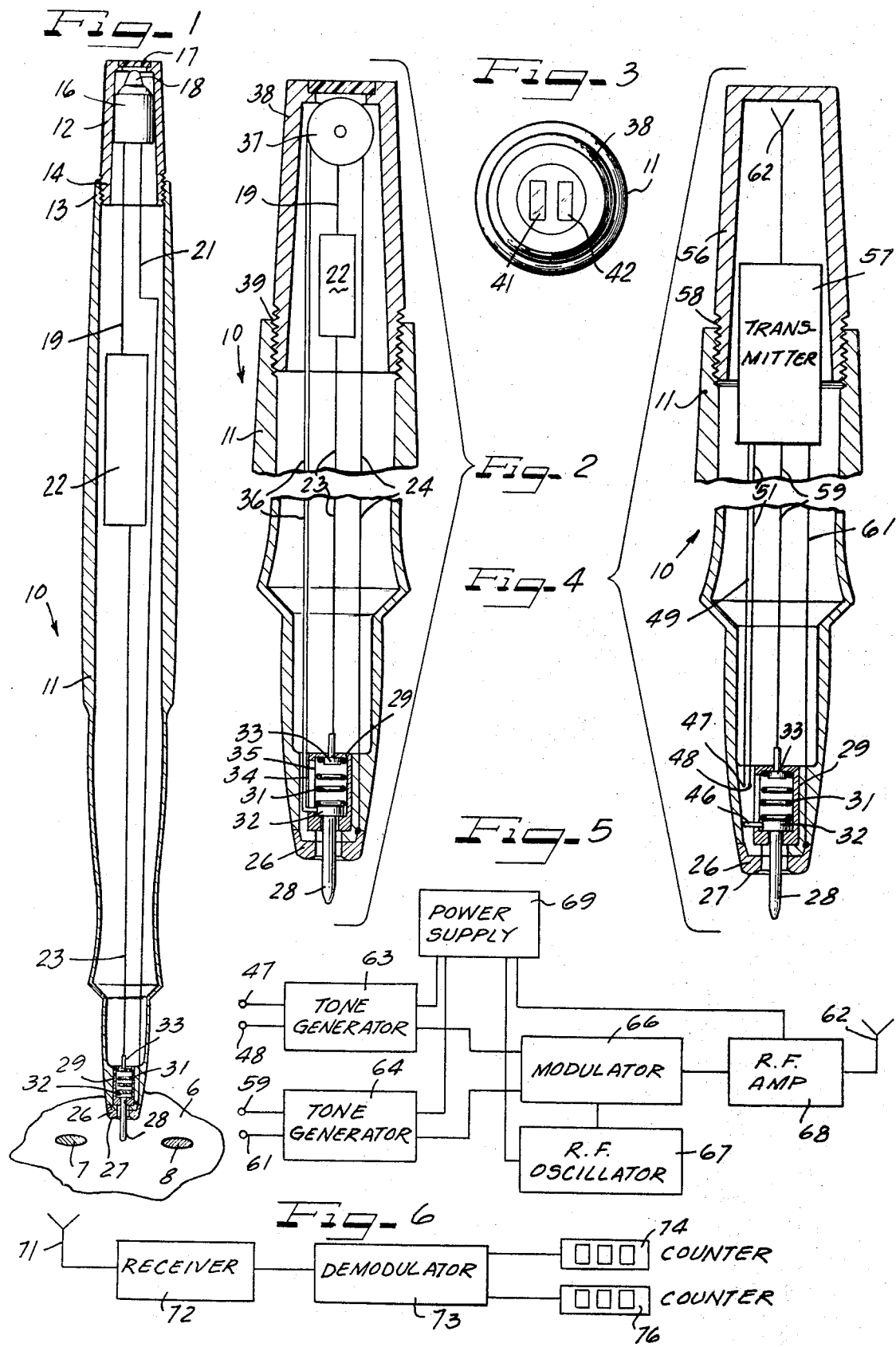

APPARATUS FOR TEACHING

BACKGROUND OF THE INVENTION

1. Field of the Invention

This invention relates in general to teaching apparatus and methods and in particular to an improved teaching tool.

2. Description of the Prior Art

Conventional known teaching and testing methods have utilized multiple choice test questions in which the student selects one of a number of answers to a particular question. Such answers might be marked with an "X" with a pencil but the student does not know the correct answer until after the papers have been graded and returned to him.

SUMMARY OF THE INVENTION

The present invention provides apparatus and method for teaching wherein multiple choice questions are provided which have multiple answering areas which appear to the student to be the same but wherein the answer area associated with the correct answer is electrically conductive and wherein the student has a pen or probe with a pair of electrodes which may be brought into contact with the answer area such that a correct answer will be indicated by the device.

In one embodiment a pair of electrodes in a hand-held pen is arranged with one annular electrode in the end of the pen and the second plunger electrode mounted within the annular electrode such that when the plunger electrode is depressed by pushing the pen down to engage the annular electrode with the electrically conductive area, an electrical circuit is energized. The electrical circuit might energize a light so that the student knows that he has selected a correct answer, or, it might energize a counter which accumulates a number of correct answers which are selected.

The device might also include a second counter which counts the number of times the plunger electrode is actuated so that the difference between the number of times the device is actuated and the number of times that an electrically conductive area is encountered may be indicated. Thus indicating the number of incorrect answers which the student selected.

Other objects, features and advantages of the invention will be readily apparent from the following description of certain preferred embodiments thereof taken in conjunction with the accompanying drawings, although modifications and variations may be effected without departing from the spirit and scope of the novel concepts of the disclosure and in which:

BRIEF DESCRIPTION OF THE DRAWINGS

FIG. 1 is a sectional view of the teaching device of this invention;

FIG. 2 is a sectional view of a modified form of the invention;

FIG. 3 is an end view of the embodiment illustrated in FIG. 2;

FIG. 4 is a sectional view of a further modified form of the invention;

FIG. 5 is a block diagram illustrating the modification of FIG. 4; and

FIG. 6 illustrates a remote receiving means for detecting signals from the embodiment of FIGS. 4 and 5.

DESCRIPTION OF THE PREFERRED EMBODIMENTS

FIG. 1 illustrates the teaching tool of this invention comprising a generally pen-shaped member 10 which has a main body portion 11 of generally cylindrical shape which may be held in the hand of the user which has an upper cylindrical portion 12 which is threadedly received in the cylindrical portion 11 which has threads 13 which mate with threads 14 on the portion 12. A light socket 16 is mounted in the member 12 which carries a light 18 which is visible through the transparent end 17 of the portion 12. A pair of electrical supply leads 19 and 21 are connected to the light socket 16 and the lead 21 extends through the member 11 and is electrically connected to an annular conductive electrode 26 mounted in the end of the tool and which has a surface engaging portion 27. A second retractable probe electrode 28 extends through the annular electrode 26 and is retractably mounted in a cylindrical guide member 29. The plunger 28 has a enlarged head member 32 within the cylindrical member 29 and a spring 31 engages the enlarged portion 32 and biases the plunger 28 to the extended position as illustrated in FIG. 1. Electrical contact 33 is mounted in the member 29 and engages the enlarged portion 32 of the electrode 28 when the electrode is depressed such that its end is flush with the contact surface 27 of electrode 26. The contact 33 is connected by lead 23 to one terminal of a battery 22 which has its other terminal connected to lead 19.

The teaching device 10 of this invention is utilized with books or answer sheets a portion of which is designated by the numeral 6 adjacent the end of the device 10. Selective answer indicating areas 7 and 8 are formed on the sheet 6 with some of the areas 7 and 8 being formed of electrical conductive material and others being formed of electrical insulating material. However, all of the areas look alike so that a student cannot discern which ones are electrically conductive by merely looking at them.

In use, the student reads a question which has a plurality of answers associated therewith and areas 7 and 8 corresponding to the number of alternative answers are associated with the question. The student selects the answer area which he believes corresponds to the correct answer and then places the point of the plunger 28 in the area and depresses the device 11 such that the plunger 28 is retracted into the body of the device and the large portion 32 engages the contact 33 completing the electrical circuit between plunger 28 and the conductor 23. Simultaneously, the contact surface 27 engages at least a portion of the selected answer area and if the student has selected the correct answer the electrical conductive surface of such answer will complete the circuit between contacts 28 and 27, thus completing the circuit to the light 18 through the battery 22 and the light 18 will be turned on and may be observed by the student through the window 17. Alternatively, if the student has selected an incorrect answer area even though the contact 32 engages contact 33, and the contact 26 engages the surface of the answer area, the circuit will not be completed between contacts 26 and 28 due to the insulating properties of the answer area associated with an incorrect answer. The student then selects an alternative answer until he makes the correct choice at which time the light 18 will be turned on and the student then knows that he has the correct answer. Thus, the teaching tool of the invention allows the student to do independent study and he immediately knows if he has selected the correct answer to a problem as in that case the light 18 will be turned on. On the other hand, if an incorrect answer has been selected he has eliminated at least one answer and can make another selection and continue until he has selected the correct answer.

FIGS. 2 and 3 illustrate a second embodiment of the invention which incorporates counters which record and accumulate the total number of selections which have been made by a student as well as the total number of correct answers which have been selected by the student. This embodiment assists the student by indicating his progress in the lesson. For example, suppose there are 20 questions relating to a particular lesson. The student selects an answer for each question until he has selected the correct answer before proceeding to the next question. One counter means provided in the device accumulates the total number of selections which the student has made and a second counting device accumulates the number of correct answers which the student has made. If, for example, the student selects the correct answer on the first time for all 20 questions, the number of selections coincides with the number of correct answers obtained and the two counters will have been advanced the same number of integers and a perfect score will have been made by the student. On the other hand, the difference between the number of selections made by the student and the number of correct answers selected, indicates the number of wrong choices made by the student, and the higher this number is, the more work on the material is needed by the student.

In the embodiment of FIGS. 2 and 3, the light has been replaced by a counter 41 which is mounted in the top portion 38 which mates with the threads 39 of the main body portion 11. The leads 19 and 24 are connected to the counter 41 and the counter advances one integer each time the plunger 28 is depress to engage the contact 33 and an electrical conductive answer area is engaged by contacts 26 and 28. Cylindrical guide member 29 for the plunger 28 is formed with a slot 35 and a mechanical counting actuating lever 34 extends through and is connected to the portion 32 of plunger 28 and has an extending portion 36 which engages a ratchet 37 of a mechanical counter 42 which is visible through the top portion 38 as shown in FIG. 3. The linkage 36 and ratchet 37 advance the counter 42 one integer each time the plunger 28 is depressed so as to accumulate the total number of times the plunger 28 has been depressed.

FIGS. 4-6 illustrate an embodiment of the invention wherein the teaching tool 10 actuates remotely located counters and may be used for example such that the selection of answers by a student is displayed to the instructor at a central location. In this embodiment, a transmitter 57, having an antenna 62 is mounted in the main body portion 11 which has an upper cap portion 56 which threadedly mates with the threads 58 of the body portion 11. The plunger 28 has an electrically conducting extension 46 which moves in the slot of the cylindrical guide member 29 such that it engages contacts 47, 48 every time the plunger 28 is depressed into the confines of the main body portion 11. The contact 33 is connected by lead 59 to the transmitter 57 and the contact 26 is connected by lead 61 to the transmitter 57. Leads 49 and 51 are also connected to the transmitter 57.

As shown in FIG. 5, contacts 47 and 48 are connected to a tone generator 63 to energize it each time the contact 46 engages contacts 47 and 48. The leads 59 and 61 are connected to a second tone generator 64 which is energized each time the retractable contact 28 is depressed into the body of the member 11 and an electrical conductive answer area completes the circuit between contacts 28 and 26. A modulator 66 receives the output of the tone generators 63 and 64, and receives an input from an R.F. oscillator 67 and provides a modulated output to an R.F. oscillator 68 which is connected to antenna 62. A power supply 69 supplies power to various units of the transmitter and might comprise a battery which is replaceable or rechargeable.

At a remote location an antenna 71 is connected to a receiver 72 which is tuned to receive the radiated signal from the transmitter 57 and supplies an output to a demodulator 73 which demodulates the tones from the tone generators 63 and 64 and respectively supplies the outputs to counters 74 and 76. The counter 74, for example, might be energized and advanced one integer each time the tone generator 63 is keyed and thus the counter 74 would indicate the number of times the contact 28 had been depressed until the contact 46 engages the contacts 47 and 48. The counter 76 would be advanced one integer each time the tone generator 64 is keyed which corresponds to the number of times a circuit is completed through electrical conductive answer area between electrodes 28 and 27.

Although in the embodiments of FIGS. 4-6, the radio transmitter is illustrated, it is to be realized that the leads 49, 51, 59 and 61 could be carried by cable from the teaching device 10 to the counters 74 and 76 so that they would be directly energized by completion of the circuit between contacts 47 and 48 by contact 46 and the completion of the circuit between contacts 26 and 28 and enlarged portion 32 and contact 33.

It is seen that the present invention provides a mechanical device which counts the number of tries in a learning experience and provides an electrical circuit which will count the number of successes. Although the invention has been described with respect to preferred embodiments, it is not to be so limited as changes and modifications may be made therein which are within the full intended scope as defined by the appended claims.

We claim as our invention:

1. A teaching device comprising: an electrical conductive surface; a hand probe including a main body portion; a first electrode mounted on one end of said main body portion; a second movable electrode mounted on said one end of said main body portion adjacent said first electrode and spring biased to a first extended position and movable to a second retracted position such that its end lies in the same plane as said first electrode; an electrical indicating circuit connected to said first and second electrodes such that when both of said electrodes engage an electrical conductive surface said indicating circuit is energized, wherein said first electrode is annular shaped and is mounted about said second electrode, wherein said indicating circuit includes a radio transmitter and a battery connected between said first and second electrodes, a first tone generator connected to said first and second electrodes, said transmitter keyed by said first tone generator to transmit a first tone signal each time both said first and second electrodes engage an electrical conductive surface, a radio receiver remotely located from said hand probe and connected to a counter which is advanced one integer each time said transmitter is keyed by said first tone signal.

2. A teaching device according to claim 1, further including third and fourth electrical contacts connected to said transmitter which are electrically connected together each time said second electrode is moved to said second position, a second tone generator connected to said third and fourth electrodes and said transmitter keyed to transmit a second tone signal, and a second counter connected to said radio receiver and advanced one integer each time said second tone signal is transmitted.

* * * * *